United States Patent [19]

Manzoni

[11] 4,388,840
[45] Jun. 21, 1983

[54] CONTROL DEVICE FOR CONTROLLING AN OUTSIDE REARVIEW MIRROR FROM INSIDE A VEHICLE

[76] Inventor: Stéphane Manzoni, 1, rue Pasteur, Saint Claude, France, 39200

[21] Appl. No.: 145,702

[22] Filed: May 1, 1980

[30] Foreign Application Priority Data

May 16, 1979 [FR] France .................... 79 12494

[51] Int. Cl.³ .............................................. F16C 1/10
[52] U.S. Cl. ..................................... 74/501 M; 74/502
[58] Field of Search ................ 74/501 R, 501 M, 502

[56] References Cited

U.S. PATENT DOCUMENTS

| 2,933,019 | 4/1960 | Milton et al. | ............ 74/501 M |
| 3,352,524 | 11/1967 | Rossi | ............ 74/501 M |
| 3,390,588 | 7/1968 | Savage . | |
| 3,411,372 | 11/1968 | Skillin | ............ 74/501 M |
| 3,459,470 | 8/1969 | Hahn . | |

FOREIGN PATENT DOCUMENTS 1408068 9/1964 France .
2333670 12/1975 France .
1008228 10/1965 United Kingdom .

Primary Examiner—Kenneth J. Dorner
Attorney, Agent, or Firm—Lewis H. Eslinger

[57] ABSTRACT

Control device for controlling an outside rearview mirror from inside a vehicle.

The crosspiece is provided with a bore in which a shaft is mounted for axial sliding and rotation, one end of which shaft is integral with an operating member, while the other end is provided with a pivotally mounted slide comprising two lugs moving in two inclined grooves, provided in parallel faces of the collar which faces are perpendicular to the second axis, the said shaft comprising a means for being driven in rotation about the first axis, which means cooperates with the mirror supporting member.

The inventions finds an application for adjusting vehicle rearview mirrors.

5 Claims, 10 Drawing Figures

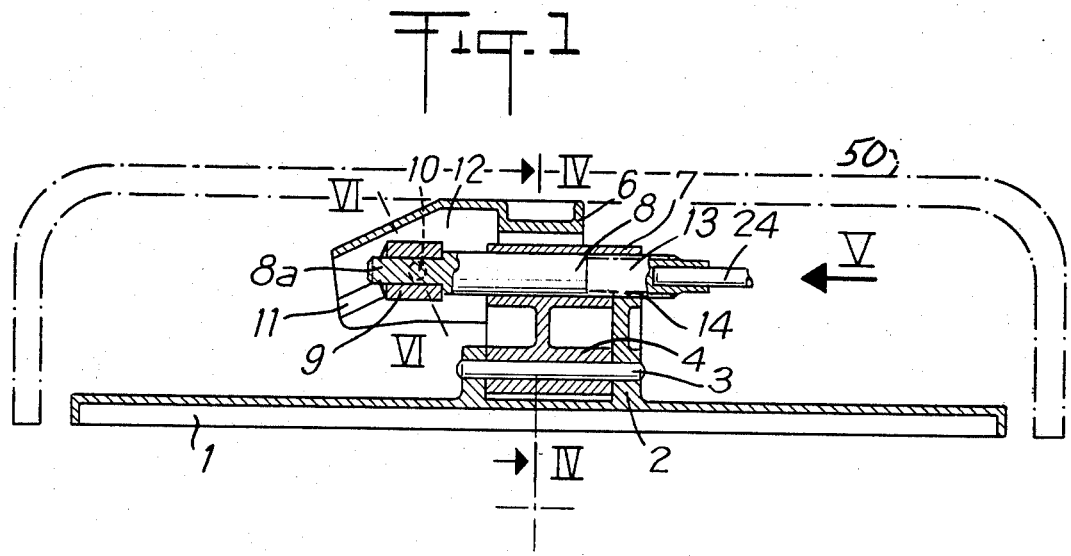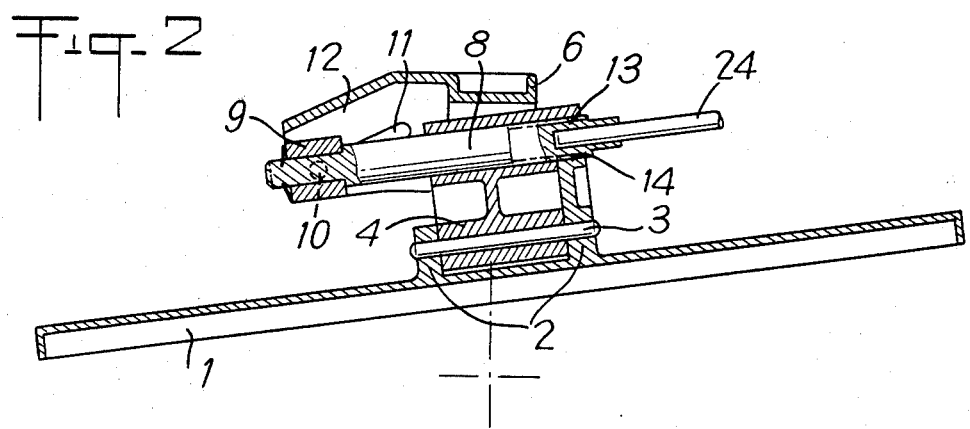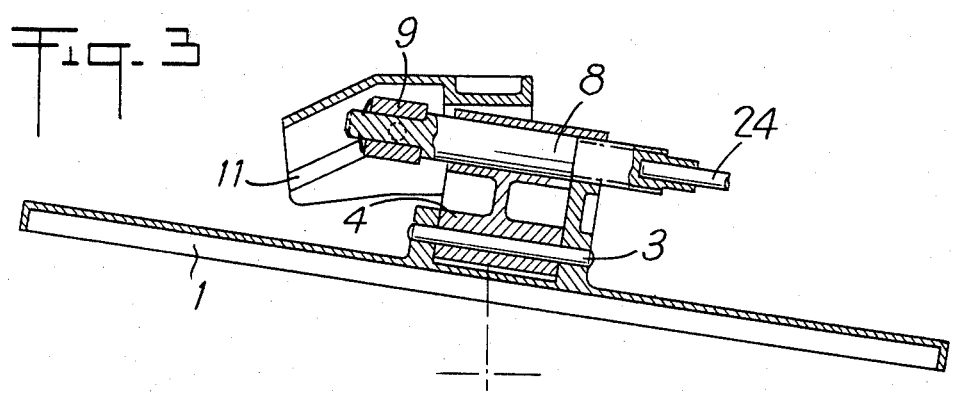

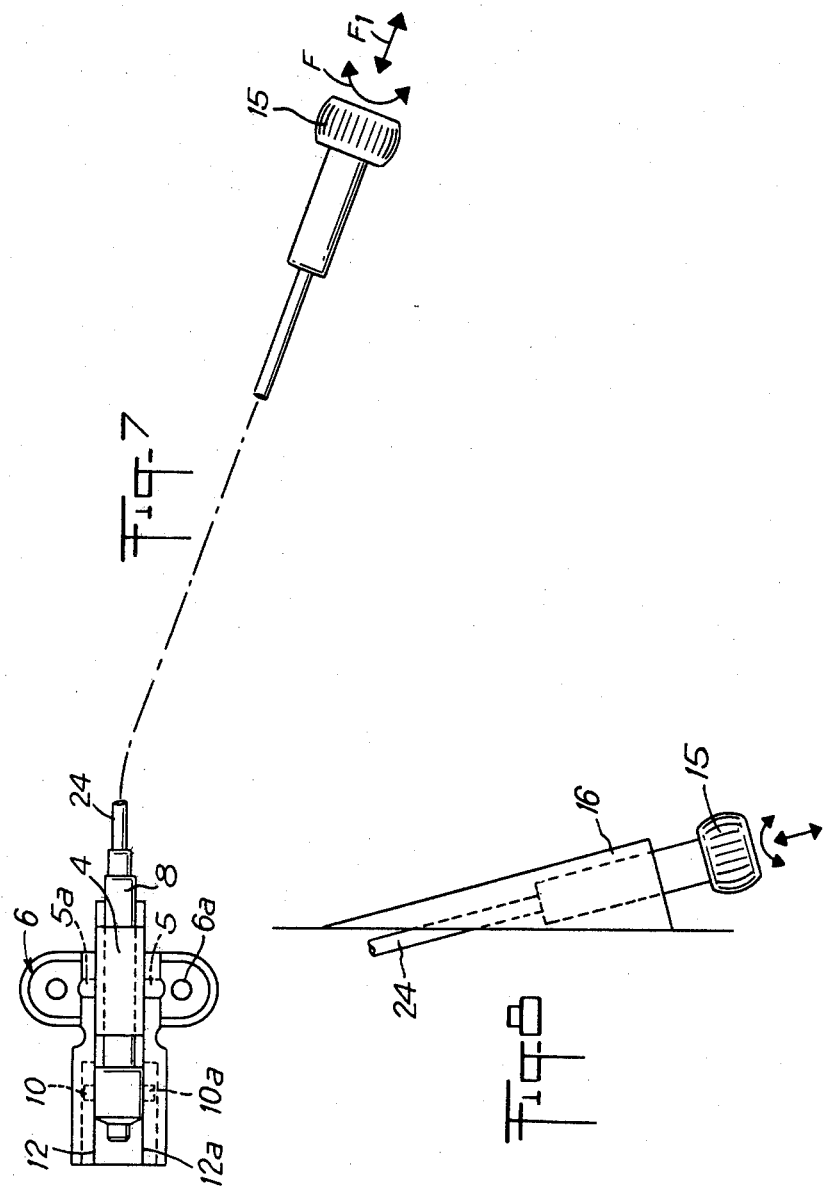

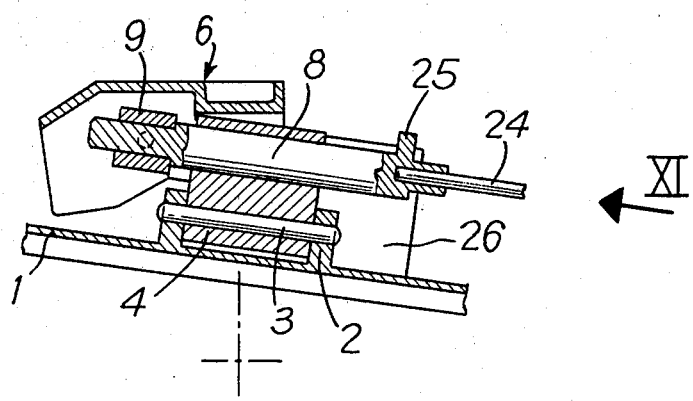
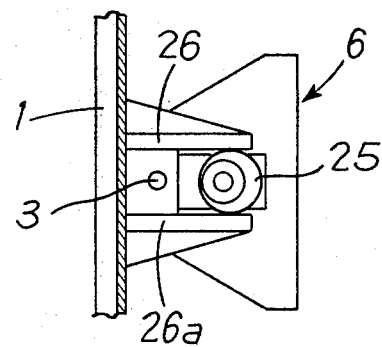

CONTROL DEVICE FOR CONTROLLING AN OUTSIDE REARVIEW MIRROR FROM INSIDE A VEHICLE

The present invention relates to a device for controlling an outside rearview mirror from inside a vehicle and in particular, rearview mirrors with so-called "bracket or triangle" fitting.

Remotely-controlled rearview mirrors are known wherein the mirror is pivotally mounted, by means of a spherical joint or of two perpendicular axes, on a casing integral with the vehicle.

It is also known to use a direct action operating cable for controlling the "left-to-right" and "north-south" movements, which cable is movable by axial sliding or by rotation in order to obtain a "left-to-right" or "north-south" movement of the mirror. The known devices have been using different means for converting the movements, which means have up to now proved rather unsatisfactory.

The object of the present invention is precisely to improve this type of control device.

According to the invention, the crosspiece is provided with a bore in which a shaft is mounted for axial sliding and rotation, one end of which shaft is integral with an operating member, whilst the other end is provided with a pivotally mounted slide comprising two lugs moving in two inclined grooves, provided in parallel faces of the collar, which faces are perpendicular to the second axis, the said shaft comprising a means for being driven in rotation about the first axis, which means cooperates with the mirror supporting member.

The device according to the invention permits to obtain a regular movement of the mirror and is easy to operate. It is also very simple and inexpensive.

The invention will be more readily understood on reading the following description with reference to the accompanying drawings, in which:

FIGS. 1 to 3 are elevations and longitudinal cross-sections of an embodiment of the rearview mirror control device according to the invention, seen in different positions;

FIG. 7 is a view displaced by 90° with respect to FIG. 1, of the collar, the mirror-holder not being shown;

FIG. 8 is a view of an embodiment of the control knob;

FIG. 9 is an elevation and a longitudinal cross-section of another embodiment of the rearview mirror control device;

FIG. 10 is a side view of the device aong arrow XI of FIG. 9.

Figure 4:
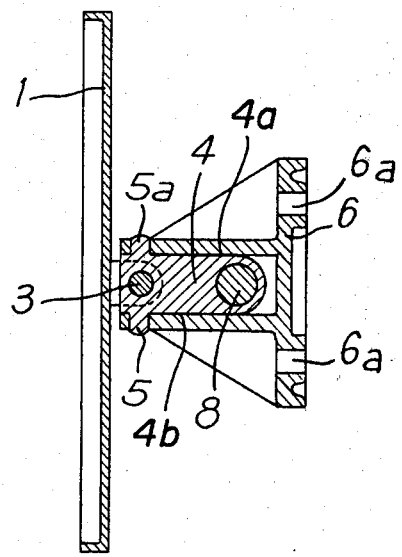
FIG. 4 is a cross-section along line IV—IV of FIG. 1.
Figure 5:
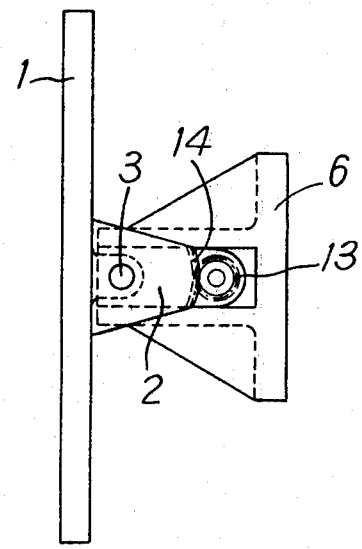
FIG. 5 is a side view of the device along arrow V of FIG. 1.
Figure 6:
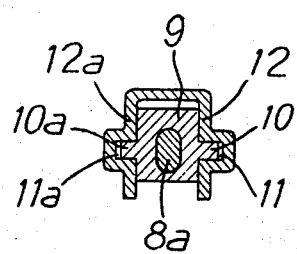
FIG. 6 is a cross-section along line VI—VI of FIG. 1.

FIGS. 1 to 7 show an embodiment of a rearview mirror control device which comprises a mirror supporting member 1 which is provided on its rear face with a fork 2 in which is mounted a first horizontal axis 3 on which is pivotally mounted a crosspiece 4 provided with two lugs 5, 5a engaged in corresponding holes made in a collar 6, provided with holes 6a for securing it by means of fastening members on the base of a rearview mirror casing 50, not shown in the drawing. The lugs 5, 5a are situated along a second axis which permits a vertical pivoting of the crosspiece and of the mirror support. Crosspiece 4 also has two parallel faces 4a and 4b (FIG. 4) perpendicular to the second axis.

The crosspiece 4 is provided with a bore 7 in which a shaft 8 is mounted for axial sliding and rotation, one end of which shaft is integral with an operating member 24 composed of a flexible cable.

At its other end, the shaft 8 is provided with a prominent part 8a on which is pivotally mounted a slide 9 comprising two lugs 10, 10a which are slidably mounted in two inclined grooves 11, 11a of the extension of the collar 6 provided with two parallel faces 12, 12a against which moves the slide 9.

Said parallel faces 12, 12a of the collar 6 are perpendicular to the second axis materialized by the lugs 5, 5a.

At its end situated on the side of the operating member, the shaft 8 is provided with a pinion 13, formed on the shaft 8 or added thereon, the said pinion 13 meshing with a toothed segment 14 (FIG. 5), formed at the end of the extension of one of the arms of the fork 2 which is perpendicular to the supporting member 1.

As shown in FIG. 7, the operating cable 24 extending inside the vehicle where it is mounted on a bracket, comprises at its end a control knob 15 permitting to impart a rotation movement to the cable 24 in the direction of arrow F or an axial sliding movement in the direction of arrow F1.

According to another embodiment shown in FIG. 8 the end of the cable 24 which is provided with the control knob 15 is mounted in a support and guiding casing 16 fitted on the vehicle door.

The rearview mirror control device operates as follows, with reference to FIGS. 1 to 7.

To rotate the knob 15 in the direction of arrow F, causes the rotation of the cable 24, the shaft 8 and the pinion 13 which cooperates with the toothed segment 14 integral with the mirror supporting member 1, so that said latter pivots about axis 3 in a "north-south" direction.

To pull or to push the knob 15 in an axial direction corresponding to arrow F1, causes the axial movement of the cable 24, the shaft 8 and the slide 9 which, via the lugs 10, 10a engaged in the inclined grooves 11, 11a of the collar 6, ensures the pivoting movement of the crosspiece 4 and of the mirror support 1 about the vertical axis materialized by the lugs 5, 5a, in a "left-to-right" direction, as illustrated in FIGS. 1 to 3.

FIGS. 9 and 10 show a variant embodiment wherein the pinion 13 and the toothed segment 14 are omitted and replaced by an eccentric disk 25, which causes, via the walls 26, 26a, a movement of the mirror support about the axis 3 and a "north-south" movement of the mirror.

The invention is not limited to the embodiments shown, but on the contrary covers all the variants that may be made thereto without departing from the scope thereof.

What is claimed is:

1. A control device for controlling an outside rearview mirror from inside a vehicle, comprising:
 a casing adapted to be secured to the vehicle and having a base;
 a mirror supporting member;
 a collar attached to the base of the casing;
 a cross-piece for pivotally mounting said mirror supporting member about a first axis, said cross-piece being pivotally mounted on said collar about a second axis which is perpendicular to said first axis, said cross-piece including a bore, said collar further including parallel faces which are perpendicular to said second axis, said parallel faces including inclined grooves;

an operating member for controlling movement of said outside rearview mirror; and a shaft mounted for rotational and axially sliding movement in said bore, one end of said shaft being attached to said operating member and the other end of said shaft including a pivotally mounted slide having two lugs adapted for movement in said inclined grooves of said parallel faces, said shaft including means cooperating with the mirror supporting member and adapted to be rotationally driven about said first axis when said shaft is rotationally moved in said bore.

2. The device of claim 1, wherein the mirror supporting member includes a rear face having a toothed segment and said means cooperating with the mirror supporting member includes a pinion secured to and adapted for rotation with the shaft and being in meshing relation with the toothed segment provided in the rear face of the mirror supporting member.

3. The device of claim 1, wherein the mirror supporting member includes two parallel walls which are perpendicular thereto and said means adapted to be rotationally driven about the first axis includes an eccentric member secured to and adapted for rotation with the shaft, said eccentric member being situated between said two walls.

4. The device of any one of claims 1, 2 or 3, wherein the operating member includes a flexible cable having an end provided with a control knob.

5. The device of any one of claims 1, 2 or 3, wherein the operating member includes a flexible cable mounted in a casing integral with a door of said vehicle and having an end provided with a control knob.

* * * * *